No 108927

John Miller Jr Lock Nut

4283

REISSUED FEB 28 1871

Witnesses.
Sydney E. Smith,
Z. C. Robbins

Inventor.
John Miller Jr.
by Attorneys
Brown, Coombs & Co.

THE NORRIS PETERS CO., PHOTO-LITHO., WASHINGTON, D. C.

United States Patent Office.

JOHN MILLER, JR., OF MARSHALLTOWN, IOWA

Letters Patent No. 108,927, dated November 1, 1870; reissue No. 4,283, dated February 28, 1871.

IMPROVEMENT IN LOCK-NUTS.

The Schedule referred to in these Letters Patent and making part of the same.

*To all whom it may concern:*

Be it known that I, JOHN MILLER, Jr., of Marshalltown, Marshall county, State of Iowa, have invented certain new and useful Improvements in "Nut-Locks;" and do hereby declare that the following is a full, clear, and exact description thereof, reference being had to the accompanying drawing and to the letters marked thereon making a part of this specification, in which—

The nature of my invention consists in a novel manner of locking the nut upon the end of the bolt, as will be more fully hereinafter described.

A A in the annexed drawing represent the section of a railroad track.

B B represent the fish-joints, both being of the usual construction.

Figure 1:
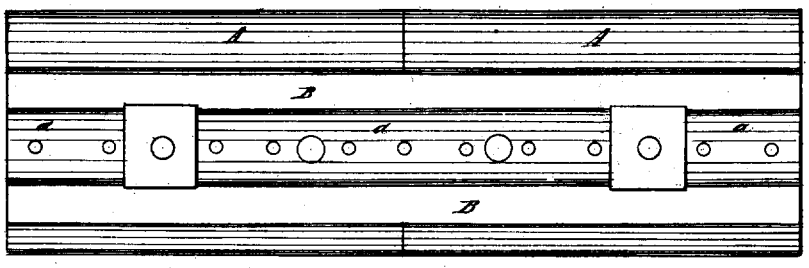
Figure 1 represents a side view of two sections of a railroad track, showing the elongated metal strip attached to the fish-plate.
Figure 2:
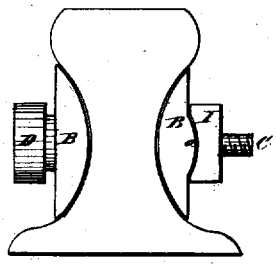
Figures 2 and 3 represent an end view and detached bolt showing my nut-lock.
Figure 4:
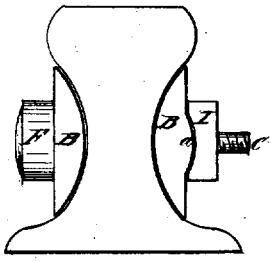
Figures 4 and 5 represent similar views of a modification of the same.

Upon the exterior of the fish-joint B is secured an elongated metal bar, *a*, which is convex on its outer face, as shown in figs. 1, 2, and 4.

C represents the bolt which passes through the fish-pieces B B and rails A, as well as through the bar *a*.

Figure 3:
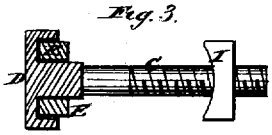
Figure 5:
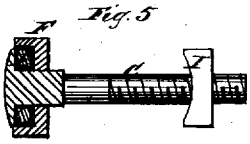

This bolt is made in the usual form, excepting that a cavity is formed in the under side of the head D to receive a rubber or other spring, E, as shown in fig. 3, or I use, immediately under the head of the bolt C, a recessed washer, F, inclosing said spring E.

I represents the nut which secures the bolt. This nut is grooved or made concave on its inner side, so as to snugly fit the convexity of the metal bar *a*.

The operation of my invention is substantially as follows:

The rubber spring being in the head D or in the washer F, the bolt C, in the latter case, is passed through the washer F, then through the usual openings in the fish-pieces B B and the rails A, as well as the plate *a*. The nut I is then screwed on the end of the bolt tightly, compressing the spring, and clasping itself against the convex-plate *a*, making a substantial lock. By my invention the nut cannot work itself loose from the bolt by jarring or otherwise.

My nut-lock is applied to the usual form of fish-pieces in common use. I add, or form with one of the fish-pieces, an elongated rib, and use a bolt having a recessed head inclosing a spring, or immediately under the head of the bolt a recessed washer inclosing a spring.

The nut I use has two concave grooves crossing each other at right angles, and which fit over the convex rib.

I am aware that a nut-lock composed of a bolt with a convex under surface, of head and convex nut, with two concave spring fish-pieces countersunk around the holes where the bolt passes, for the head and nut to fit in, is not new; hence I disclaim such to be any part of my invention.

Having thus fully described my invention,

What I claim as new, and desire to secure by Letters Patent, is—

The combination of the elongated plate *a* convex on its outer surface, the bolt C, and nut I concave on its inner surface, and the spring E, substantially as and for the purpose hereinbefore set forth.

Witnesses: JOHN MILLER, JR.

R. D. ZUBLIN,

A. RUSSELL.